Aug. 30, 1927. 1,640,814
W. C. BLACKWOOD
DISTRIBUTION UNIT FOR ELECTRIC CIRCUITS
Original Filed Feb. 21, 1922   2 Sheets-Sheet 1
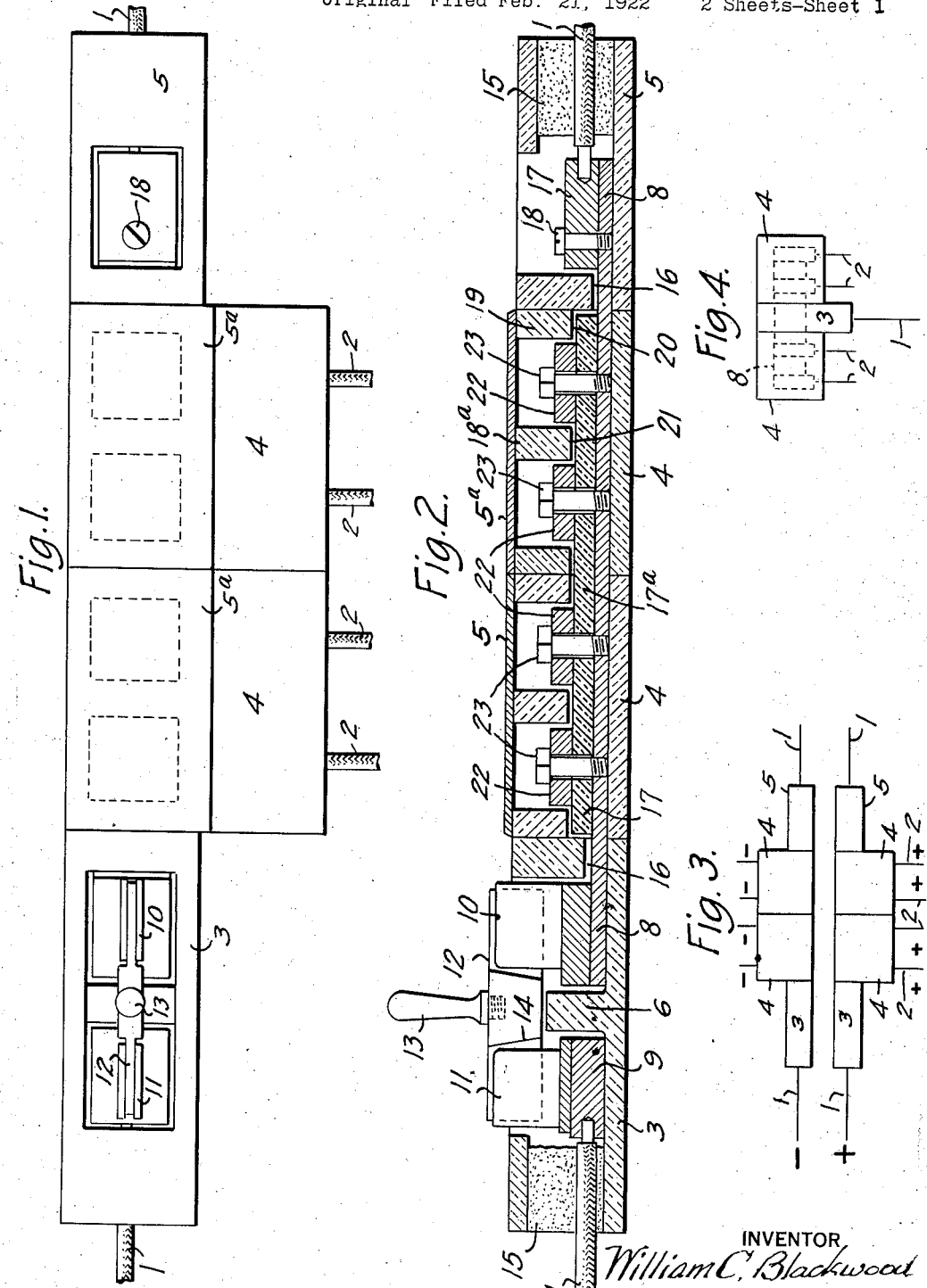
INVENTOR
William C. Blackwood
BY
D. Anthony Usina
ATTORNEY

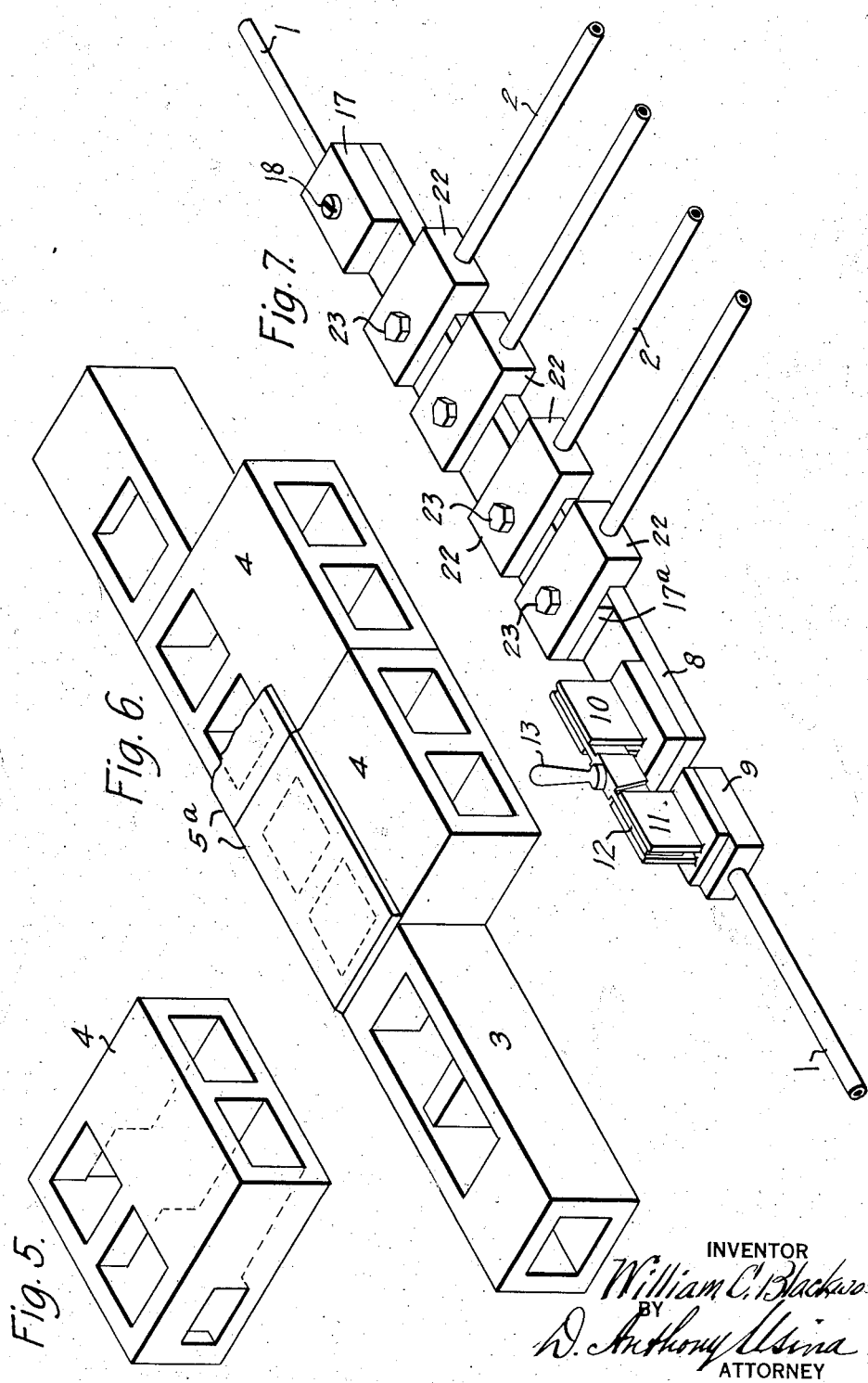

Patented Aug. 30, 1927.

1,640,814

UNITED STATES PATENT OFFICE.

WILLIAM C. BLACKWOOD, OF ELMHURST, NEW YORK, ASSIGNOR, BY MESNE ASSIGNMENTS, TO THOMAS E. MURRAY, JR., OF BROOKLYN, NEW YORK.

DISTRIBUTION UNIT FOR ELECTRIC CIRCUITS.

Application filed February 21, 1922, Serial No. 538,212. Renewed March 31, 1926.

My invention aims to provide a box or unit for this purpose and means for making the connections therein, by which the structure can be made simple and compact and the desired connections and disconnections can be made easily and quickly.

The accompanying drawings illustrate embodiments of the invention.

Fig. 1 is a plan of a set of boxes or units for taking four taps off a main;

Fig. 2 is a longitudinal section through the same;

Figs. 3 and 4 are diagrams of different arrangements of the boxes or units;

Fig. 5 is a perspective view of one of the units of Figs. 1 and 2;

Fig. 6 is a perspective view of Fig. 1 with the bus and wires removed;

Fig. 7 is a perspective view of the bus and wires of Fig. 1, omitting the boxes.

Fig. 1 shows an arrangement in which a main 1 is to be provided with four taps 2. Three styles of boxes or units are indicated at 3, 4 and 5. These boxes are placed together in the desired arrangement with gaskets and plastic compound between their edges to form a good bearing and a waterproof joint and are clamped or fastened together in any one of various known ways. They are made of porcelain and the openings in the top of the same are covered with porcelain plates such as are indicated for example at 5ª, any suitable packing being provided at the edges and the covers being also fastened or clamped down in any one of various known ways. The box 3 is open at each end and has a cross wall 6 at an intermediate point separating the bus bar 8 from the line terminal 9. The line terminal and the bus bar carry extension plates 10 and 11 adapted to make frictional contact with a removable switch blade 12 made extra thick at the middle and provided with a handle 13. The thickened portion has tapered shoulders 14 for facilitating the introduction of the blade. The cross wall 6 is low enough to permit the blade to be thrust down into the box a considerable distance. A body 15 of lead wool or other suitable packing is introduced around the end of the main 1. At the outlet end of the box 3 the end wall is formed with a slot 16 of just sufficient size to permit the easy passage of the bus bar.

The box 5 at the other end of the assembly receives the opposite end of the bus bar 8 and has a terminal block 17 fastened thereon by means of a screw 18, into which terminal block the main 1 is fastened by soldering or in any other suitable way.

The bus bar extends continuously through the intermediate boxes 4. Overlying this is a plate or strip 17ª of insulating material. A transverse wall 18ª extends across each box. The end walls 19 are provided with slots 20 of sufficient width to accommodate the bus bar 8 and also the ends of the insulating plate 17ª. The cross wall 18ª is provided with a similar slot 21 through which the bus bar and insulating plate pass.

Each of the compartments formed by the end walls and the transverse wall of the box extends continuously in a lateral direction and accommodates a terminal block 22, Fig. 7, which has a portion overlying the insulating strip and which extends laterally therefrom and is formed at its end with a socket for the receipt of one of the taps or service wires 2. Each of the terminals 22 is held down by means of a screw 23 passing freely through the terminal and through the insulating plate and threaded into the bus bar. This screw provides a very simple device for connecting or disconnecting any one of the taps with the bus or main line. By unscrewing and withdrawing the screw the electric connection between the bus and the terminal is broken. The engagement of the plate and bus under the end walls and transverse wall of the box holds them in place during the withdrawal of the connecting screw.

Each of these boxes 4 may have a single compartment where only one tap and one terminal are required. Or a single box 4 may be arranged with a greater number of compartments than two.

Fig. 3 illustrates two sets of units similar to Fig. 1, one for the positive main and service wires and the other for the negative main and service wires.

Fig. 4 illustrates an alternative style of the box 3, where the taps are to be applied to the ends of the main 1. In this case the bus 8 extends through openings in the side walls of the unit 3 instead of in the end wall as in Fig. 2. Various other arrangements may be made. For example, a switch box like 3 may be applied at each end of the service boxes to permit the cutting out of this one section of service wires; or blocks like 5, without switches may be used at each end if switches are not necessary.

Other insulating material may be substituted for the porcelain referred to.

Though I have described with great particularity of detail certain specific embodiments of my invention yet it is not to be understood therefrom that the invention is restricted to the particular embodiments disclosed. Various other constructions and designs may be made by those skilled in the art without departing from the invention as defined in the following claims.

What I claim is—

1. The combination with a bus and insulating plate and a branch terminal, of a box or unit for an electric distribution system having an opening through one side adapted to permit endwise insertion of said bus and insulating plate, and having an opening through another side adapted to permit endwise insertion of said branch terminal in position to overlie said insulating plate, the walls of the box holding said bus, plate and terminal from removal except in a direction endwise of said bus, plate and terminal respectively, and said box having a top opening through which a connector for said bus and terminal may be inserted and withdrawn.

2. The combination with a bus and insulating plate and a branch terminal, of a box or unit for an electric distribution system having an opening through one side adapted to permit endwise insertion of said bus and insulating plate, and having an opening through another side adapted to permit endwise insertion of said branch terminal in position to overlie said insulating plate, the walls of the box holding said bus, plate and terminal from removal except in a direction endwise of said bus, plate and terminal respectively, and said box having a top opening through which a connector for said bus and terminal may be inserted and withdrawn, and a second box having a registering lateral opening through which the bus may extend into it for connection with a main line terminal therein.

3. The combination with a bus and insulating plate and a branch terminal, of a box or unit for an electric distribution system having openings through opposite ends adapted to permit passage of said bus endwise therethrough and insertion of said insulating plate, and having a side opening adapted to permit endwise insertion of said branch terminal in position to overlie said insulating plate, the walls of the box holding said bus, plate and terminal from removal except in a direction endwise of said bus, plate and terminal respectively, and said box having a top opening through which a connector for said bus and terminal may be inserted and withdrawn.

4. A box or unit having openings through its sides, a bus and an overlying insulating plate passing into the box through one of said openings and located in the box in line with said openings, a branch terminal passing through another of said openings and located in line therewith and overlying said plate, the walls of the box holding said parts against removal except in a direction endwise of said parts respectively, and a connector for the bus and the terminal passing through the insulating plate, the box being open at the top for access to said connector.

5. A box or unit having openings through its sides, a bus and an overlying insulating plate passing into the box through one of said openings and located in the box in line with said openings, a branch terminal passing through another of said openings and located in line therewith, and overlying said plate, the walls of the box holding said parts against removal except in a direction endwise of said parts respectively, and a screw passing through said terminal and insulating plate and having threaded engagement with the bus, the box being open at the top for access to said screw.

6. A distributing unit comprising a main bus, a branch, an insulating member between said bus and branch, a removable connector passing through the insulating member and making an electric connection between said bus and branch, and a casing in which said bus and branch are held in position when said connector is removed.

7. A distributing unit comprising a main bus, a branch, an insulating member between said bus and branch, a removable connector passing through the insulating member and making an electric connection between said bus and branch, and a casing having a wall of which a portion overlies said bus and holds it in position when said connector is removed.

8. A distributing unit comprising a casing, a main bus held in position on the bottom of the casing, a branch extending through a side wall of the casing and overlying said bus, an insulating member carried on said bus between the bus and the branch and a removable connector passing through the branch and the insulating member and engaging the bus.

In witness whereof, I have hereunto signed my name.

WILLIAM C. BLACKWOOD.